(12) United States Patent
Trindade et al.

(10) Patent No.: US 6,765,767 B2
(45) Date of Patent: Jul. 20, 2004

(54) MAGNETORESISTIVE HEAD ON A SIDE WALL FOR INCREASED RECORDING DENSITIES

(75) Inventors: Isabel G. Trindade, Pittsburgh, PA (US); Michael A. Seigler, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 41 days.

(21) Appl. No.: 09/999,286

(22) Filed: Nov. 15, 2001

(65) Prior Publication Data

US 2002/0057538 A1 May 16, 2002

Related U.S. Application Data

(60) Provisional application No. 60/249,082, filed on Nov. 15, 2000.

(51) Int. Cl.[7] .................................................. G11B 5/39
(52) U.S. Cl. ....................................... 360/319; 360/322
(58) Field of Search ................................ 360/319, 321, 360/322, 324, 324.1

(56) References Cited

U.S. PATENT DOCUMENTS

| | | | | |
|---|---|---|---|---|
| 5,446,613 A | * | 8/1995 | Rottmayer | 360/319 |
| 6,359,750 B1 | * | 3/2002 | Hughbanks et al. | 360/128 |
| 6,400,537 B2 | * | 6/2002 | Sakakima et al. | 360/324.2 |
| 6,466,419 B1 | * | 10/2002 | Mao | 360/324.12 |
| 6,512,660 B1 | * | 1/2003 | Li et al. | 360/324 |
| 6,519,119 B1 | * | 2/2003 | van der Heijden et al. | 360/324 |
| 6,538,856 B1 | * | 3/2003 | Gill | 360/319 |
| 6,563,679 B1 | * | 5/2003 | Li et al. | 360/324 |
| 2001/0012186 A1 | * | 8/2001 | Sakakima et al. | 360/324.2 |
| 2002/0027753 A1 | * | 3/2002 | Ishiwata et al. | 360/324.2 |
| 2002/0030947 A1 | * | 3/2002 | Chen et al. | 360/319 |

FOREIGN PATENT DOCUMENTS

| JP | 01122009 A | * | 5/1989 | G11B/5/31 |
|---|---|---|---|---|
| JP | 2000293820 A | * | 10/2000 | G11B/5/39 |

OTHER PUBLICATIONS

A. Maeda et al., "GMR in Corrugated Co/Cu Multilayers", *IEEE Trans. Magn.*, 33, pp. 3535–3537 (1997).

* cited by examiner

*Primary Examiner*—William Klimowicz
(74) *Attorney, Agent, or Firm*—Robert P. Lenart, Esq.; Benjamin T. Queen, II, Esq.; Pietragallo, Bosick & Gordon

(57) ABSTRACT

A read head for use with magnetic recording media having a plurality of magnetic tracks includes a read sensor, first and second magnetic lead shields for improving track resolution, and first and second magnetic shields for improving linear resolution. The read sensor is formed on a side wall of one of the first and second magnetic lead shields using a technique such as ion beam deposition for enhanced film growth rate on the side wall. A magnetic disc drive storage system incorporating the read head and a method of making the read head are also included.

20 Claims, 5 Drawing Sheets

MAGNETORESISTIVE HEAD ON A SIDE WALL FOR INCREASED RECORDING DENSITIES

CROSS REFERENCE TO RELATED APPLICATION

This application claims the benefit of U.S. Provisional Application No. 60/249,082 filed on Nov. 15, 2000.

FIELD OF THE INVENTION

The invention relates to magnetic recording heads, and more particularly, to a read head for detecting magnetically encoded information in magnetic storage media and a related method for making such a read head.

BACKGROUND OF THE INVENTION

Devices utilizing the giant magnetoresistance (GMR) effect have utility as magnetic sensors, especially in read heads used in magnetic disc storage systems. The GMR effect is observed in thin, electrically conductive multi-layer systems having magnetic layers. Magnetic sensors utilizing the GMR effect are frequently referred to as "spin valve" sensors.

A spin valve sensor is typically a sandwiched structure including two ferromagnetic layers separated by a thin non-ferromagnetic layer. One of the ferromagnetic layers is called the "pinned layer" because it is magnetically pinned or oriented in a fixed and unchanging direction. A common method of maintaining the magnetic orientation of the pinned layer is through anti-ferromagnetic exchange coupling utilizing a proximate, i.e. adjacent or nearby, anti-ferromagnetic layer, commonly referred to as the "pinning layer." The other ferromagnetic layer is called the "free" or "unpinned" layer because its magnetization can rotate in response to the presence of external magnetic fields.

The benefits of spin valve sensors result from a large difference in electrical conductivity exhibited by the devices depending on the relative alignment between the magnetizations of the GMR element ferromagnetic layers. In order for antiferromagnetically pinned spin valve sensors to function effectively, a sufficient pinning field from the pinning layer is required to keep the pinned ferromagnetic layer's magnetization unchanged during operation. Various anti-ferromagnetic materials, such as PtMn, NiMn, FeMn, NiO, IrMn, PtPdMn, CrMnPt, RuRhMn, and TbCo, have been used or proposed as antiferromagnetic pinning layers for spin valve sensors. GMR sensors can be used to sense information encoded in magnetic storage media. In operation, a sense current is passed through a GMR stack. The presence of a magnetic field in the storage media adjacent to the sensor changes the resistance of a GMR stack. A resulting change in voltage drop across the GMR stack due to the change of the resistance of the GMR stack can be measured and used to recover magnetically stored information.

These sensors typically comprise a stack of thin sheets of a ferromagnetic alloy, such as NiFe (permalloy), magnetized along an axis of low coercivity. The sheets are usually mounted in the head so that their magnetic axes are transverse to the direction of disc rotation and parallel to the plane of the disc. The magnetic flux from the disc causes rotation of the magnetization vector in at least one of the sheets, which in turn causes a change in resistivity of the stack.

A magnetic sensor for use in a disc drive can include a first shield, a second shield, and a GMR stack located between the first shield and the second shield. A permanent magnet can be located adjacent to the GMR stack to provide a bias magnetic field. For operation of the sensor, a sense current is caused to flow through the GMR stack. As resistance of the GMR stack changes, the voltage across the GMR stack changes. This is used to produce an output voltage.

A schematic of a conventional spin valve head 10 is illustrated in FIGS. 1A and 1B. The head 10, shown as formed on a substrate 11, includes a top shield 12 and a bottom shield 14 separated by a reproduce gap width, G, which includes leads 15 and 16 and may include the layers of insulation 13. The head 10 also includes a read sensor 20 positioned between the top and bottom shields 12 and 14 and adjacent the leads 15 and 16. The read sensor 20 has a track-width dimension, designated as Wt, which is defined by a permanent magnet (not shown) and leads 15 and 16. The read sensor 20 also includes a stripe height dimension, designated as Hs, along which the flux from the recorded media bit is propagated until it closes in a closed path to the shields 12 and 14. As illustrated by coordinate system 17, the X direction refers to a down-track direction and the Z direction refers to a cross-track direction.

Despite the improvements in head sensitivity as a result of, for example, utilizing GMR heads, storage technology trends indicate that heads providing higher sensitivity, higher linear resolution, and higher track-resolution will be required for increased information retrieval capabilities of magnetic recording systems. Linear resolution generally relates to linear density, i.e. how many bits of information may be packed into a given length of magnetic track on the magnetic recording media. Track-resolution generally relates to track density, i.e. a measure of how tightly a plurality of magnetic tracks are packed onto a disc which forms the magnetic recording media. Such improvements have been evolving by reducing the bits aspect ratio of track-width to bit length to values of the order of about one. Therefore, heads with lateral dimensions of the order of the sensor film thickness will become necessary. While head sensitivity has been increased by enhancing the magnetoresistive effect ratio, as described, track-resolution and linear resolution have been improved by lithographically scaling sensor width and scaling magnetoresistive element to shield spacing, respectively. However, such techniques have limitations as the need for higher sensitivity and higher linear and track-resolution increases.

As head dimensions continue to decrease in conjunction with the higher linear and track-resolutions, there is an increased likelihood of non-intended magnetic fields being read by the head. Specifically, the head may sense a magnetic field from tracks adjacent to a magnetic track upon which a read operation is being performed and/or sense an adjacent magnetic domain within the magnetic track upon which a read operation is being performed. Either situation results in a decreased effectiveness of the read head. Spin valve heads, having the need for an insulator between the sensor, the permanent magnet biasing and leads and the shields have a linear resolution always limited by the total thickness of the stack and the insulator. Moreover, the track-width is defined by the permanent magnet and leads. The permanent magnet and the sensor are magnetostatically coupled. The control of magnetostatic coupling, profile of the junction and less than, for example, 100 nm track-widths become a complex problem.

Thus, there is identified a need for improved recording heads which provide for increased recording densities.

SUMMARY OF THE INVENTION

The invention meets the identified need, as well as other needs, as will be more fully understood following a review of the specification and drawings.

In accordance with an aspect of the invention, a read head for use with magnetic recording media having a plurality of magnetic tracks, each of the tracks having a plurality of magnetic domains, wherein the read head comprises a read sensor and first and second magnetic lead shields structured and arranged to shield the read sensor from a magnetic field within magnetic tracks adjacent to the magnetic track upon which a read operation is being performed. The read sensor is formed on a side wall of one of the first and second magnetic lead shields that are part of a set of two shields determining the track-width. The read sensor may be a spin valve, a GMR multilayer or a tunneling magnetoresistive sensor. To illustrate the invention, the read sensor is assumed to use a current perpendicular to the plane defined by the magnetization of the layers.

In accordance with a further aspect of the invention, a read head for use with magnetic recording media having a plurality of magnetic tracks, each of the tracks having a plurality of magnetic domains, wherein the read head comprises a read sensor, first and second magnetic lead shields, and first and second magnetic shields. The first and second magnetic lead shields are structured and arranged to shield the sensor from a magnetic field within the magnetic tracks adjacent to the magnetic track upon which a read operation is being performed. The first and second magnetic shields are structured and arranged to shield the read sensor from a magnetic field within the magnetic track upon which a read operation is being performed. The read sensor is formed on a side wall of one of the first and second magnetic lead shields.

In accordance with an additional aspect of the invention, a magnetic disc drive storage system comprises a housing, a rotatable magnetic storage medium positioned in the housing and having a plurality of magnetic tracks, wherein each of the tracks have a plurality of magnetic domains, and a movable recording head mounted in the housing adjacent the magnetic storage medium. The recording head includes a read head, wherein the read head comprises a read sensor, first and second magnetic lead shields structured and arranged to shield the read sensor from a magnetic field within the magnetic track adjacent to the magnetic track upon which a read operation is being performed, and the read sensor is formed on a side wall of one of the first and second magnetic lead shields. This system may further include first and second magnetic shields as part of the read head, which are structured and arranged to shield the read sensor from a magnetic field within the magnetic track upon which a read operation is being performed.

In accordance with yet another aspect of the invention, a method of making a read head for a magnetic disc drive storage system comprises providing a substrate and depositing a first magnetic shield material on the substrate. The method further includes depositing a first insulating material on the first magnetic shield material and depositing a second magnetic shield material on at least a portion of the insulating material. Also included in the method is depositing a magnetoresistive material on a side wall of the second magnetic shield to form a read sensor of the read head. The method further includes depositing a third magnetic shield material on the first magnetic shield material, the magnetoresistive material and the second magnetic shield material, and planarizing the third magnetic shield material, the magnetoresistive material and the second magnetic shield material to a desired dimension. This lapping/planarization process will define the head linear resolution. Current state of the art magnetoresistive (MR) or GMR heads use stripe heights defined by combining lapping and etching that are approximately twice smaller than the current track-widths. This indicates that the use of similar techniques may be used to define the linear resolution in this novel sensor. Once the surface of the wafer is planarized, the method also includes depositing a second insulating material on the third magnetic shield material, the magnetoresistive material and the second magnetic shield material, and depositing a fourth magnetic shield material on the second insulating material.

Planarizing of the third magnetic shield material, the magnetoresistive material, and the second magnetic shield material to desired dimension may be performed using, for example, a chemical mechanical planarization process and/ or an etching process. In addition, the side wall of the second magnetic shield may be formed so as to have an angle in the range of about 75° to about 90° with respect to the layer of the substrate material. In addition, depositing a magnetoresistive material on a side wall of the second magnetic shield to form a read sensor of the read head may be performed by ion beam deposition with the ion beam deposition being targeted at the side wall of the second magnetic shield at an angle of about 10° to about 20° with respect to the layer of the substrate material.

DETAILED DESCRIPTION OF THE INVENTION

The invention provides a magnetoresistive head structure on a side wall for increased recording densities for a magnetic recording head, particularly suitable for use with a magnetic disc storage system. A recording head as used herein refers to a head capable of performing read and/or write operations. In addition, the head may use giant magnetoresistive (GMR), spin valves (SV), spin tunneling (TMR) and the like.

Figure 2:
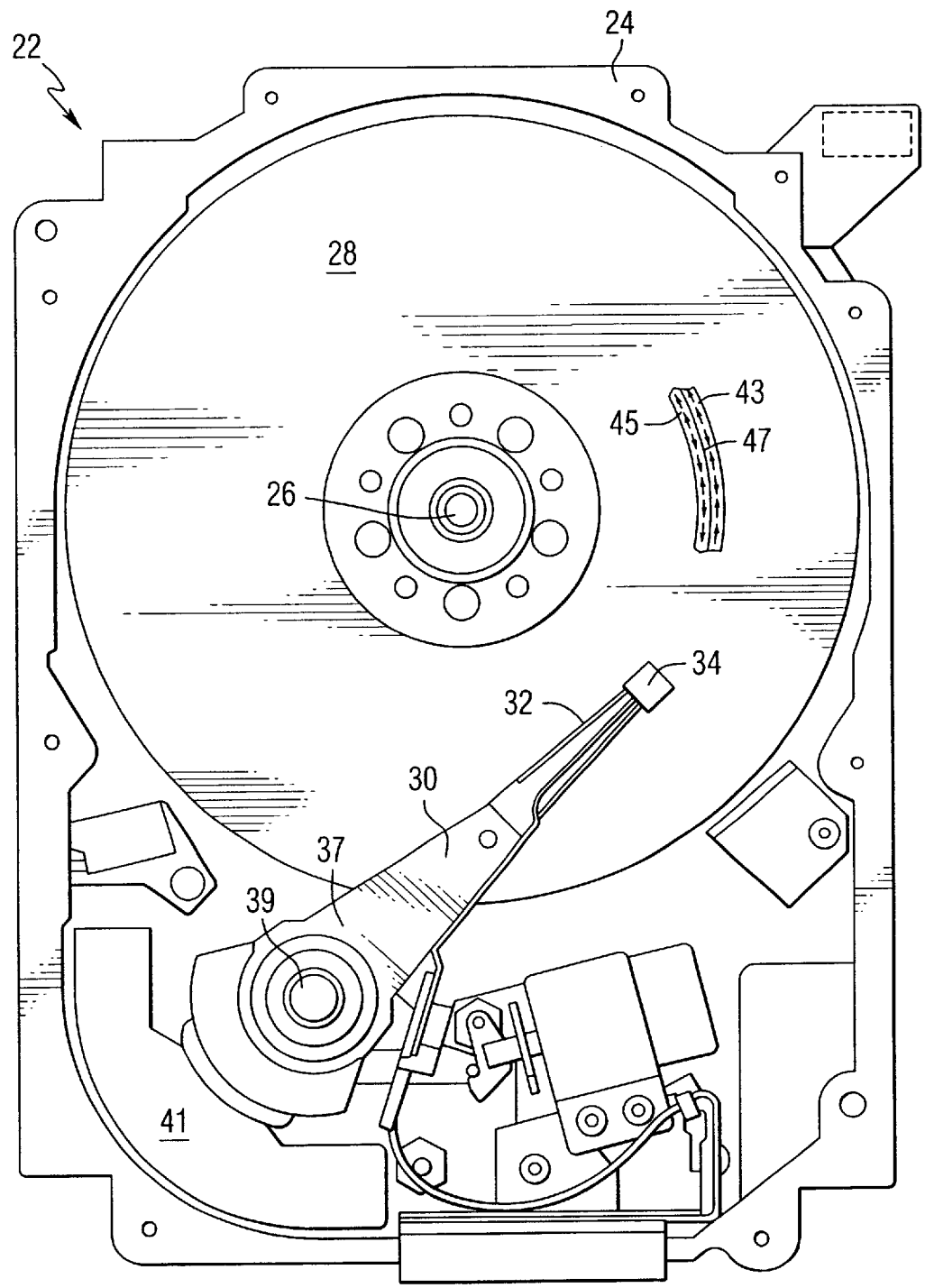
FIG. 2 is a pictorial representation of a disc drive that can use the magnetoresistive head constructed in accordance with this invention.

FIG. 2 is a pictorial representation of a disc drive 22 that may utilize the magnetoresistive head constructed in accordance with this invention. The disc drive includes a housing 24 (with the upper portion removed and the lower portion visible in this view) sized and configured to contain the various components of the disc drive. The disc drive includes a spindle motor 26 for rotating at least one magnetic storage medium 28 within the housing, in this case a magnetic disc. At least one arm 30 is contained within the housing 24, with each arm 30 having a first end 32 with a recording and/or read head or slider 34 and a second end 37 pivotally mounted on a shaft by a bearing 39. An actuator motor 41 is located at the arm's second end 37, for pivoting the arm 30 to position the head 34 over a desired sector of the disc 28. The actuator motor 41 is regulated by a controller that is not shown in this view and is well known in the art.

The read head 34 is configured to fly adjacent the magnetic recording medium 28 having a plurality of tracks illustrated by tracks 43, 45 which are separated by a non-magnetized transition 47. The tracks 43, 45 contain a plurality of magnetic domains capable of storing digital information according to the polarity of magnetization thereof. The magnetic domains are illustrated by arrows shown in the tracks 43, 45.

Figure 3:
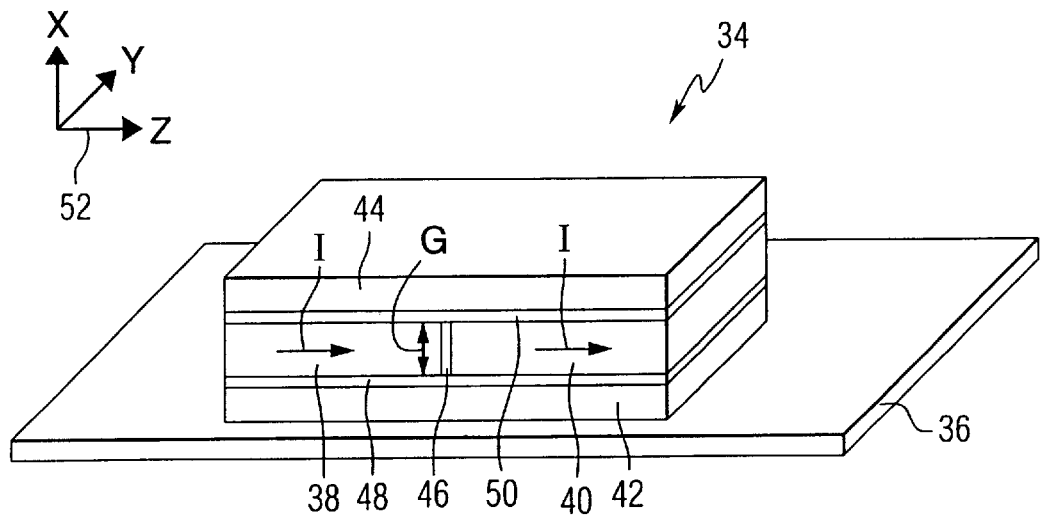
FIG. 3 is an isometric air-bearing view of a magnetoresistive head constructed in accordance with this invention.
Figure 4:
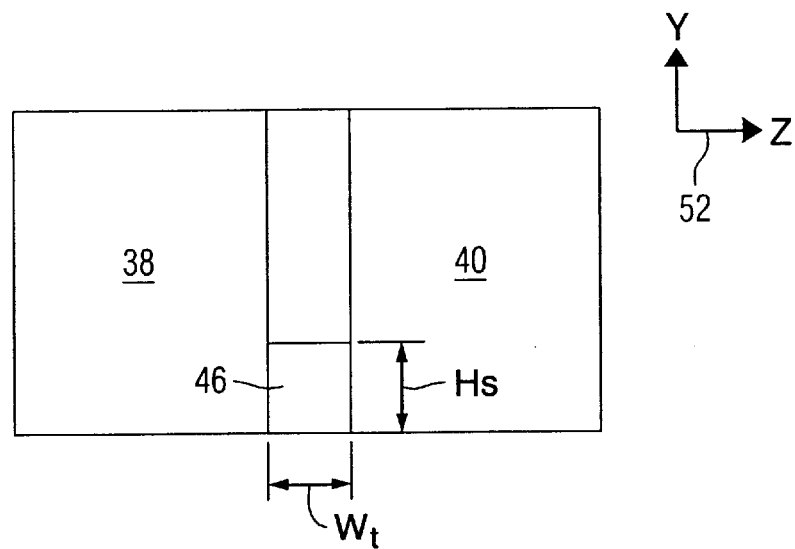
FIG. 4 is a top wafer view illustrating the read sensor of the head shown in FIG. 3.
Figure 5:
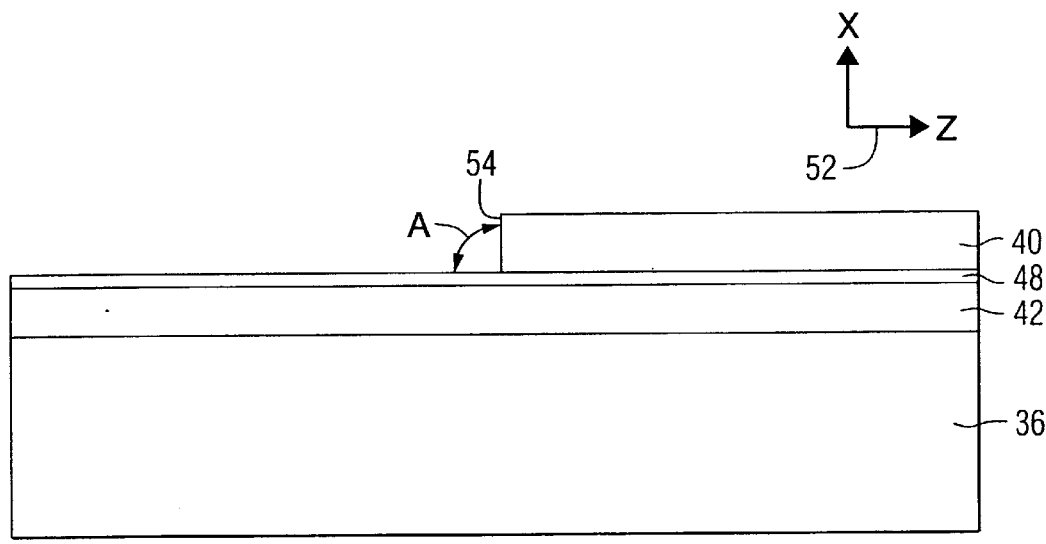
FIGS. 5–9 are views illustrating formation of the magnetoresistive head illustrated in FIGS. 3 and 4 and in accordance with this invention.

Referring to FIGS. 3 and 4, there is illustrated a read head 34 constructed in accordance with the invention. The read head 34 may be constructed on a substrate 36, as will be explained in more detail herein. The read head 34 includes a first magnetic lead shield 38, a second magnetic lead shield 40, and a first magnetic shield 42, and a second magnetic shield 44. The read head 34 also includes a read sensor 46 which may be, for example, a GMR magnetoresistive type sensor for detecting magnetic fields in the magnetic recording medium 28. The read sensor 46 may use current perpendicular to the plane (CPP) type geometry with the first and second magnetic lead shields 38 and 40 also serving as electrical conductor leads. CPP sensors operate, generally, by the sense current flowing through the sensor in a direction that is perpendicular to the planes of the layers or stack strips.

The read head 34 also includes a first layer of insulating material 48 which separates the up track magnetic shield 42 from the sensor 46 and a second layer of insulating material 50 that separates the down track shield 44 from the sensor 46. The magnetic shields 38, 40, 42, and 44 may be constructed, for example, from a material selected from the transition metal Ni, Fe, Co group which may be alloyed with Cu, Cr, Zr, Mo, or Ti when used in shields that conduct electrical current. It will be appreciated that the magnetic shields 38, 40, 42, and 44 may each be constructed of the same material or may each be constructed of a different material. In addition, the layers of insulating material 48 and 50 may be constructed, for example, from a material selected from the group alumina, AlN, $SiO_2$, or $Si_3N_4$.

The first and second magnetic lead shields 38 and 40 are structured and arranged to shield the read sensor 46 from a magnetic field within a magnetic track, such as track 43, adjacent to a magnetic track, such as track 45, upon which a read operation is being performed. In other words, the first and second magnetic lead shields 38 and 40 contribute to the track density of the read head 34. The first and second magnetic shields 42 and 44 are structured and arranged to shield the read sensor 46 from a magnetic field within a magnetic track, such as track 43, upon which a read operation is being performed to sense an intended magnetic field. The first and second magnetic shields 42 and 44, therefore, contribute to the linear-resolution of the read head 34.

The read sensor 46 is formed, in accordance with the invention, on a side wall of one of the first and second magnetic lead shields 38 and 40. The formation of the read sensor 46 on a side wall of one of the first and second magnetic lead shields 38 and 40 will be described in more detail herein in conjunction with the description of a method for making the read head 34. For purposes of this description, a side wall of the first and second magnetic lead shields 38 and 40 in the embodiment shown is defined as a surface on the first and second magnetic lead shields 38 and 40 that is generally parallel to the direction of travel of the magnetic recording medium 28 or generally perpendicular to an air-bearing surface of the read head 34. However, for additional embodiments of the invention, such as placing the read head on a side of the slider as opposed to the back of the slider, the side wall may be generally perpendicular to the direction of travel of the recording medium or generally perpendicular to the air-bearing surface. The air-bearing surface is generally a surface contained in the X-Z plane, as represented by the coordinate system 52 shown in FIG. 3 and in at least in part in other figures. As shown in FIG. 4, the first and second magnetic lead shields 38 and 40 are on opposing sides of the read sensor 46.

Referring to FIGS. 3 and 4, various parameters and dimensions of the read head 34 will be defined. Specifically, the read sensor 46, as constructed in accordance with the invention, has a track-width designated as Wt, a stripe height, designated as Hs, and a reproduce gap width or shield-to-shield spacing, designated as G. Referring to the coordinate system 52, the Z direction refers to a cross-track direction and the X direction refers to a down-track direction for a track, such as track 43 or 45 of the magnetic recording medium 28.

Referring to FIGS. 5-9, a method for making a read head, such as read head 34, will be described in detail. The method includes providing a substrate 36 which may be, for example, a conventional ceramic substrate material. The substrate may be a slider for forming the read head of the invention thereon. The method then includes depositing a magnetic shield material on the substrate 36 to form the first magnetic shield 42. Unless otherwise noted herein, the steps of depositing materials such as the magnetic shield material to form the first magnetic shield 42, are carried out using conventional deposition techniques such as, for example, sputtering or electroplating.

The method next includes depositing an insulating material on the magnetic shield 42 to form the insulative layer 48 to electrically insulate the up track shield 42 from the sensor 46. Next, a magnetic shield material is deposited on at least a portion of the insulative layer 48 to form the second magnetic lead shield 40. The second magnetic lead shield 40 is formed on at least a portion of the insulative layer 48 in order to allow for formation of the read sensor 46 on a side wall 54 thereof. The side wall may be defined by lithography and plating, reactive ion etching and/or ion-beam etching. However, it will be appreciated that, in accordance with the invention, alternatively the first magnetic lead shield 38 may be formed on at least a portion of the insulative layer 48 in order to form a side wall for formation of the read sensor 46 thereon.

The method further includes depositing a material, and specifically a magnetoresistive material, on the side wall 54 of the second magnetic lead shield 40 to form the read sensor 46. In order to most effectively facilitate formation of the read sensor 46 on the side wall 54, the side wall 54 should be made to have an angle in the range of about 75° to about 90°, and more specifically an angle of about 90°, with respect to a plane containing the substrate layer 36. A side wall 54 with angles in the stated ranges may be defined using techniques such as, for example, electroplating, ion-milling, or by reactive plasma etching. The side wall of the second magnetic shield 40 may be used as deposited, or a new side wall that is formed using lithography and an etching technique such as ion beam etching and/or reactive ion etching.

Figure 6:
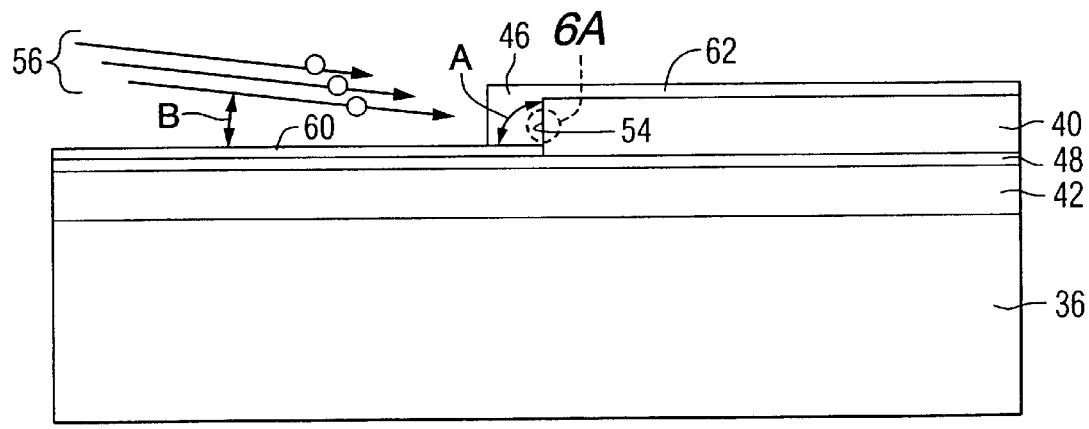

Referring specifically to FIG. 6, the magnetoresistive material as deposited to form the read sensor 46 on the side wall 54 is illustrated. Specifically, the magnetoresistive material is deposited with a technique that allows a considerably higher film growth rate on the side wall 54 than can be achieved using conventional means for film growth on the plane of a substrate, such as the substrate 36. Ion beam deposition, illustrated generally as reference number 56, is an example of a thin film preparation technique that could fulfill such a goal. In order to achieve the most effective film growth of the magnetoresistive material on the side wall 54, the ion beam deposition 56 may be targeted at the side wall 54 of the second magnetic shield 40 at an angle of about 10° to about 20°, as designated by arrow B, with respect to a plane containing the substrate layer 36. It will be appreciated that the ion beam deposition angle may be substantially less than about 10° or substantially more than about 20°.

Figure 6A:
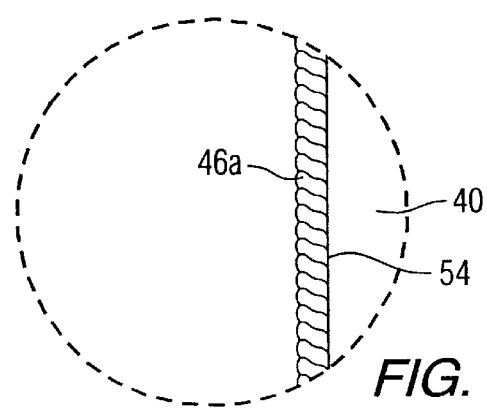

FIG. 6a is a magnified view of magnetic film growth of a layer of the magnetoresistive material 46a on the side wall 54 of the second magnetic shield lead 40. Ion beam deposition is a directional deposition technique that will allow for a film to be deposited on the side wall 54 faster than it will be deposited on the surface of the second magnetic shield 40. Other examples of directional deposition techniques are deposition by evaporation, collimated sputtering and laser ablation. If the deposition technique is such that the film on the side wall grows faster than that in the field, there will be a columnar growth in the film that is perpendicular to the surface of the side wall, as shown in FIG. 6a. This will make it very similar to a film grown using normal deposition techniques, such as sputter deposition, on the surface of a substrate instead of a side wall.

In addition to depositing the magnetoresistive material on the side wall 54 to form the read sensor 46, an amount of the magnetoresistive material may be deposited on the insulative layer 48, as designated by reference number 60, and an additional amount of the magnetoresistive material may be deposited on the second magnetic shield 40, as designated by reference number 62.

Figure 7:
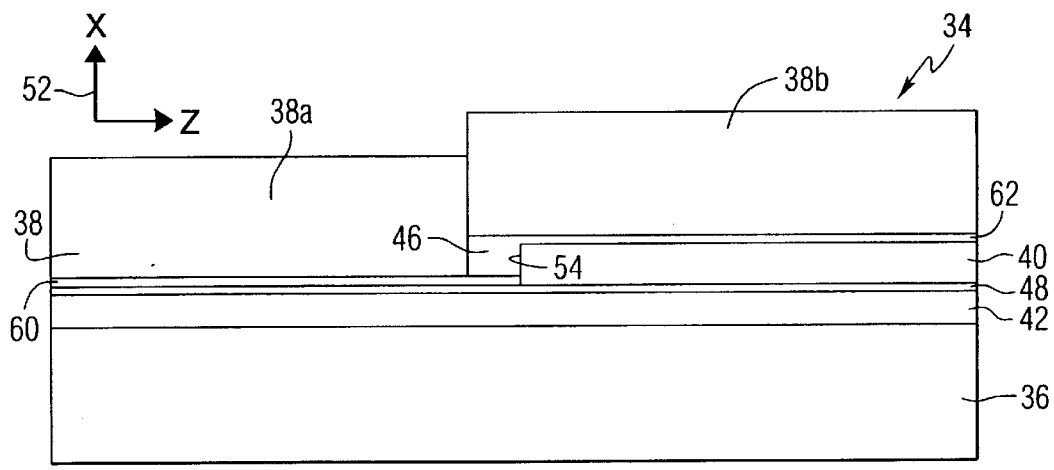

Referring to FIG. 7, the method of making the read head 34 further includes depositing additional layers of magnetic shield material 38a, 38b to form the first magnetic lead shield 38. The layers of magnetic shield material 38a and 38b are deposited on the second magnetic shield material 40, the layer of insulative material 48 and the read sensor 46 with the layers of magnetoresistive materials 60 and 62 being interposed therebetween.

Figure 8:
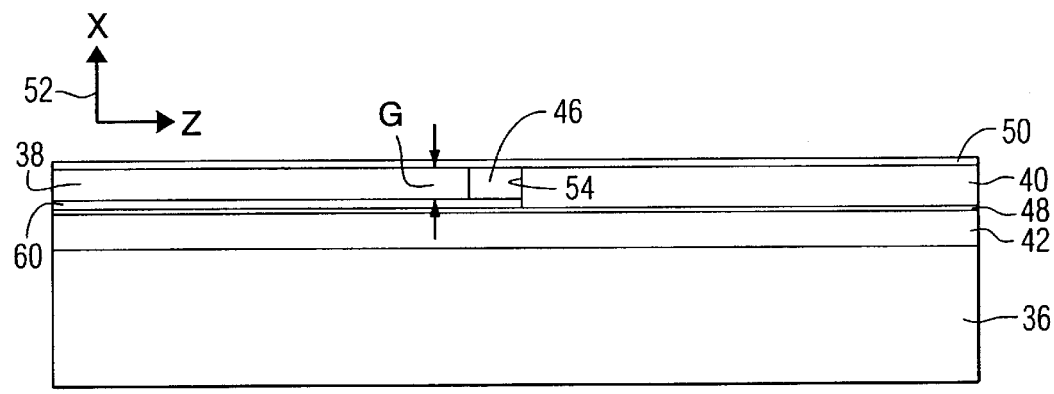

Referring to FIG. 8, the magnetic shield material 38a and 38b are processed to form the first magnetic lead shield 38 and, in conjunction with the deposition of the following layers, define the gap-width, G, of the read sensor 46. This may be done by, for example, a chemical mechanical planarization (CMP) process or by an etching process, or any other technique allowing removal of material with minimal scratches and a resolution of a few mono-layers. Such processes may also be employed for defining the stripe height, Hs, of the read sensor 46. The first magnetic lead shield 38 will be etched back at least until 38b is removed leaving only 38a to from the first magnetic shield 38. Layer 62 may also be removed in the CMP or etching process.

As also shown in FIG. 8, the additional layer of insulative material 50 is deposited on the first magnetic shield 38, the second magnetic shield 40, and the read sensor 46.

Figure 9:
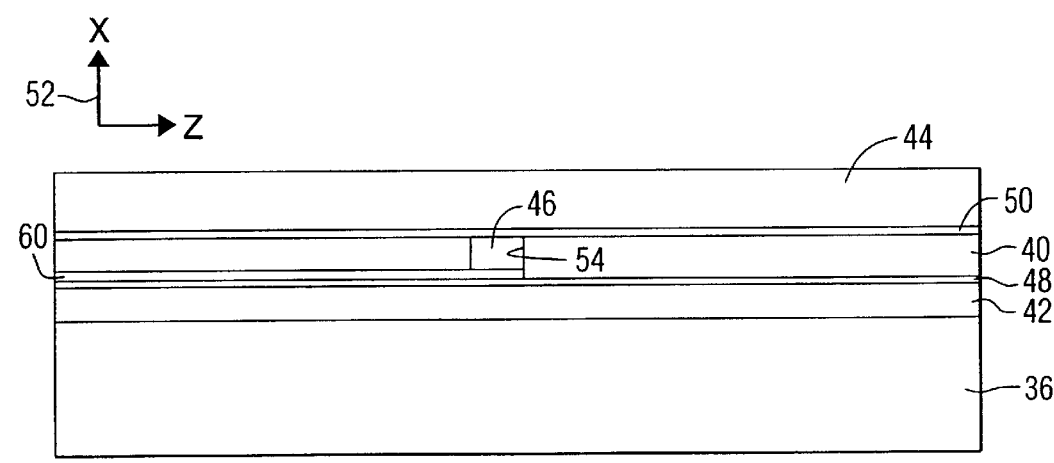

As shown in FIG. 9, the method further includes depositing an additional magnetic shield material on the layer of insulative material 50 to form the second magnetic shield 44.

The insulative materials can be deposited using any deposition technique such as but not limited to sputtering, atomic layer deposition, ion beam deposition or plasma enhanced chemical vapor deposition. The second magnetic shield 44 may be deposited using any form of deposition including but not limited to plating and sputtering.

Figure 1A:
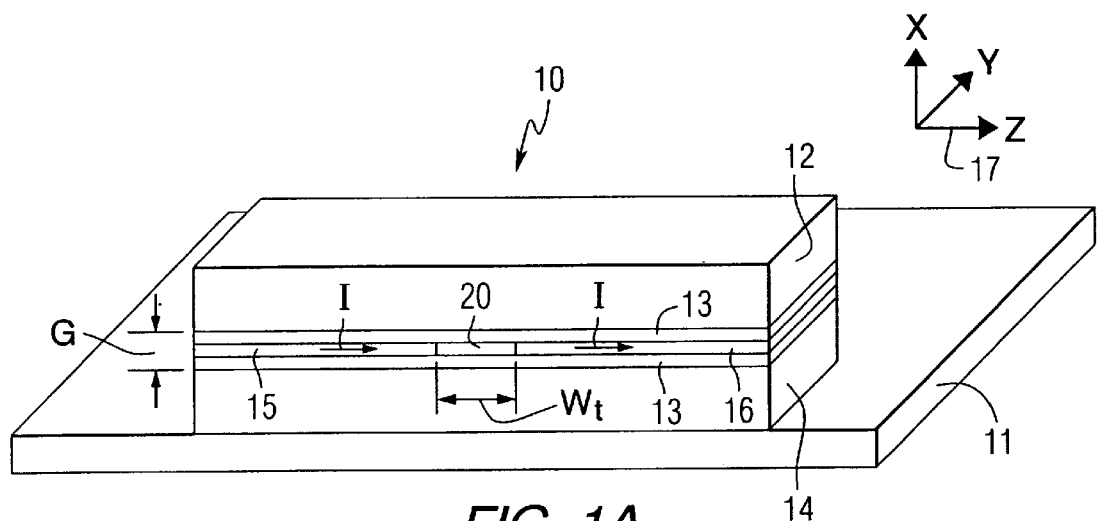
FIG. 1A is an isometric air-bearing view of a known spin valve head structure.
Figure 1B:
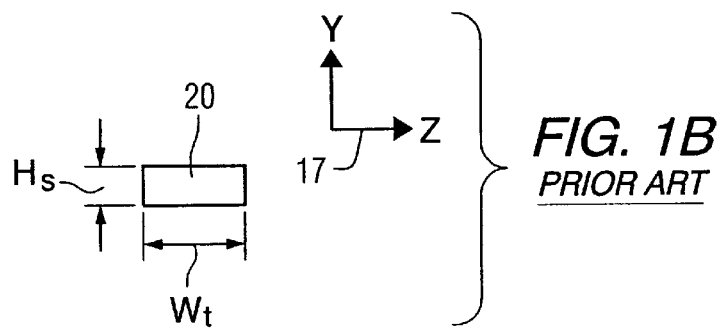
FIG. 1B is a top wafer view illustrating the read sensor of the spin valve head shown in FIG. 1A.
Figure 10:
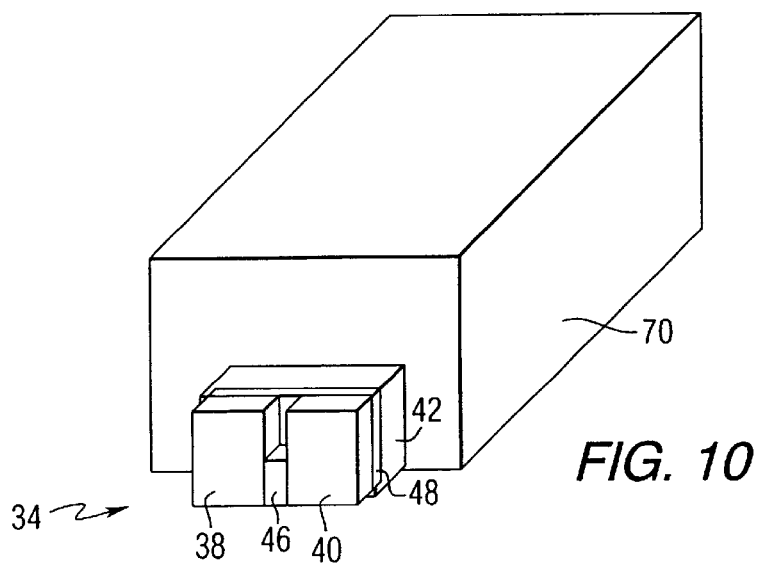
FIG. 10 is an isometric view illustrating an embodiment of the invention with a recording head mounted on a slider.

FIG. 10 illustrates an embodiment of the invention with the recording head 34 positioned on the back of a slider 70. The magnetic shield 44 and layer of insulation 50 are removed to illustrate the positioning of the recording head 34 on the back of the slider 70. In operation, the recording medium moves beneath the slider 70, in a direction from the front of the slider 70 toward the back of the slider 70 where the recording head 34 is mounted. It will be appreciated, that the recording head 34 constructed in accordance with the invention may be positioned on other areas of the slider 70 such as, for example, a side of the slider 70.

It will be appreciated that the invention provides an improved read head 34 for increased recording densities. First, the read head 34 includes magnetic shields 38, 40, 42, and 44 on all sides of the read sensor 46 for improving linear resolution and track-resolution by avoiding the sensing of undesirable magnetic fields. In addition, the invention provides for formation of the read sensor 46 on the side wall 54, as described herein, wherein the dimensions of the read sensor 46 may be reduced due to the method and techniques employed for constructing the read head 34, and more specifically, the read sensor 46.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. A read head for use with magnetic recording media, the magnetic recording media having a plurality of magnetic tracks, each of the tracks having a plurality of magnetic domains, the read head comprising:

a read sensor;

first and second magnetic lead shields structured and arranged to shield said read sensor from a magnetic field within magnetic tracks adjacent to a magnetic track upon which a read operation is being performed, wherein a longitudinal direction of the read sensor is substantially parallel to at least one side wall of the first and second magnetic lead shields, the longitudinal direction being disposed along a track direction of the magnetic recording media and said read sensor being formed on the side wall of one of said first and second magnetic lead shields.

2. The read head of claim 1, wherein said read sensor is a magnetoresistive type sensor.

3. The read head of claim 1, wherein said read sensor is a current perpendicular to the plane type sensor.

4. The read head of claim 1, wherein said first and second magnetic lead shields are electrical conductor leads.

5. The read head of claim 1, further including first and second magnetic shields structured and arranged to shield said read sensor from a magnetic field within a magnetic track upon which a read operation is being performed.

6. A magnetic disc drive storage system, comprising:

a housing;

a rotatable magnetic storage medium positioned in said housing, said magnetic storage medium having a plurality of magnetic tracks, each of the tracks having a plurality of magnetic domains;

a movable recording head mounted in said housing adjacent said magnetic storage medium; and said recording head including a read head, said read head comprising:

a read sensor;

first and second magnetic lead shields structured and arranged to shield said read sensor from a magnetic field within magnetic tracks adjacent to a magnetic track upon which a read operation is being performed and to serve as electrical conductor leads for said read sensor; and said read sensor being formed on the side wall of one of said first and second magnetic lead shield, wherein a longitudinal direction of the read sensor is substantially parallel to at least one side wall of the first and second magnetic lead shields, the longitudinal direction being disposed along a track direction of the magnetic storage medium.

7. The system of claim 6, further including first and second magnetic shields structured and arranged to shield said read sensor from a magnetic field within a magnetic track upon which a read operation is being performed.

8. The system of claim 6, wherein said read sensor is a magnetoresistive type sensor.

9. The read head of claim 6, wherein said read sensor is a current perpendicular to the plane type sensor.

10. The read head of claim 6, wherein said first and second magnetic lead shields are electrical conductor leads.

11. The read head of claim 6, further including a slider having a front side and a back side, said magnetic storage medium moving from the front side towards the back side, said recording head mounted on said back side of said slider.

12. A read head for use with magnetic recording media, the magnetic recording media having a plurality of magnetic tracks, each of the tracks having a plurality of magnetic domains, the read head comprising:

a read sensor;

first and second magnetic shields positioned on opposite sides of the read sensor in a down-track direction wherein the first and second magnetic shields shield said read sensor from a magnetic field within a magnetic track upon which a read operation is being performed;

first and second magnetic lead shields positioned on opposite sides of the read sensor in a cross-track direction, wherein the first and second magnetic lead shields shield said read sensor from a magnetic field within magnetic tracks adjacent to a magnetic track upon which a read operation is being performed; and said read sensor being formed on a side wall of one of said first and second magnetic lead shield, where in a longitudinal direction of the read sensor is substantially parallel to at least one side wall of the first and second magnetic lead shields, the longitudinal direction being disposed along a track direction of the magnetic recording media.

13. The read head of claim 12, wherein the side wall is substantially perpendicular to a side of one of the first and second magnetic shields.

14. The read head of claim 12, wherein the side wall forms an angle between 75° and 90° with respect to a side of one of the first and second magnetic shields.

15. The read head of claim 12, further comprising:

a first layer of insulation for electrically insulating the first magnetic shield from the read sensor and the first and second magnetic lead shields; and a second layer of insulation for electrically insulating the second magnetic shield from the read sensor and the first and second magnetic lead shields.

16. A magnetic disc drive storage system, comprising:

a housing;

a rotatable magnetic storage medium positioned in said housing, said magnetic storage medium having a plurality of magnetic tracks, each of the tracks having a plurality of magnetic domains;

a movable recording head mounted in said housing adjacent said magnetic storage medium; and said recording head including a read head, said read head comprising:

a read sensor;

first and second magnetic shields positioned on opposite sides of the read sensor in a down-track direction wherein the first and second magnetic shields shield said read sensor from a magnetic field within a magnetic track upon which a read operation is being performed;

first and second magnetic lead shields positioned on opposite sides of the read sensor in a cross-track direction, wherein the first and second magnetic lead shields shield said read sensor from a magnetic field within magnetic tracks adjacent to a magnetic track upon which a read operation is being performed; and said read sensor being formed on a side wall of one of said first and second magnetic lead shield, wherein a longitudinal direction of the read sensor id substantially parallel to at least one side wall of the first and second magnetic lead shields, the longitudinal direction being disposed along a track direction of the magnetic storage medium.

17. The system of claim 16, wherein the side wall is substantially perpendicular to a side of one of the first and second magnetic shields.

18. The system of claim 16, wherein the side wall forms an angle between 75° and 90° with respect to a side of one of the first and second magnetic shields.

19. The system of claim 16, further including a slider having a front side and a back side, said magnetic storage medium moving from the front side towards the back sale, said recording head mounted on said back side of said slider.

20. The system of claim 16, further comprising:

a first layer of insulation for electrically insulating the first magnetic shield from the read sensor and the first and second magnetic lead shields; and a second layer of insulation for electrically insulating the second magnetic shield from the read sensor and the first and second magnetic lead shields.

* * * * *

UNITED STATES PATENT AND TRADEMARK OFFICE
CERTIFICATE OF CORRECTION

PATENT NO. : 6,765,767 B2
DATED : July 20, 2004
INVENTOR(S) : Isabel G. Trindade and Michael A. Seigler It is certified that error appears in the above-identified patent and that said Letters Patent is hereby corrected as shown below:

Column 8,
Line 34, "from" should read -- form --.

Column 11,
Line 15, "shield" should read -- shields --.
Line 16, "id" should read -- is --.

Column 12,
Line 9, "sale" should read -- side --.

Signed and Sealed this

Twenty-seventh Day of December, 2005

JON W. DUDAS
*Director of the United States Patent and Trademark Office*